US012076990B2

(12) United States Patent
Shimofuku

(10) Patent No.: US 12,076,990 B2
(45) Date of Patent: Sep. 3, 2024

(54) PIEZOELECTRIC ACTUATOR, LIQUID DISCHARGE HEAD, LIQUID DISCHARGE DEVICE, AND LIQUID DISCHARGE APPARATUS

(71) Applicant: Akira Shimofuku, Kanagawa (JP)

(72) Inventor: Akira Shimofuku, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 64 days.

(21) Appl. No.: 17/687,690

(22) Filed: Mar. 7, 2022

(65) Prior Publication Data

US 2022/0288933 A1 Sep. 15, 2022

(30) Foreign Application Priority Data

Mar. 11, 2021 (JP) ................................. 2021-039254

(51) Int. Cl.
*B41J 2/14* (2006.01)

(52) U.S. Cl.
CPC ................................. *B41J 2/14233* (2013.01)

(58) Field of Classification Search
None
See application file for complete search history.

(56) References Cited

U.S. PATENT DOCUMENTS

2011/0175967 A1 7/2011 Machida et al.
2011/0205307 A1 8/2011 Ueda et al.
2012/0038712 A1 2/2012 Akiyama et al.
2012/0236084 A1 9/2012 Watanabe et al.
2012/0276303 A1 11/2012 Watanabe et al.
2012/0314007 A1 12/2012 Shimofuku et al.
2013/0070028 A1 3/2013 Watanabe et al.
2013/0169713 A1 7/2013 Takeuchi et al.
2013/0176364 A1 7/2013 Machida et al.
2013/0194350 A1 8/2013 Watanabe et al.
2014/0049582 A1 2/2014 Machida et al.
2014/0210913 A1 7/2014 Shimofuku et al.
2014/0340854 A1 11/2014 Akiyama et al.
2014/0375728 A1 12/2014 Machida et al.
2015/0145924 A1 5/2015 Shimofuku et al.
2016/0049579 A1 2/2016 Shimofuku et al.
2017/0106650 A1* 4/2017 Miyazaki ............... B41J 2/1433
2021/0036208 A1 2/2021 Shimofuku et al.
2021/0086515 A1 3/2021 Shimofuku

FOREIGN PATENT DOCUMENTS

JP 2014-151537 8/2014
JP 2020-132780 8/2020

* cited by examiner

*Primary Examiner* — Erica S Lin
(74) *Attorney, Agent, or Firm* — XSENSUS LLP

(57) ABSTRACT

A piezoelectric actuator includes a piezoelectric element substrate including a diaphragm, multiple piezoelectric elements each including: a first electrode on the diaphragm, a piezoelectric layer on the first electrode, and a second electrode on the piezoelectric layer, a metal wiring layer on the second electrode, the metal wiring layer including wiring patterns coupled to the multiple piezoelectric elements, and a subframe bonded to a bonding region of the piezoelectric element substrate via adhesive, wherein the subframe has a recess facing the wiring patterns in the bonding region.

11 Claims, 15 Drawing Sheets

COMPARATIVE EXAMPLE

COMPARATIVE EXAMPLE

PIEZOELECTRIC ACTUATOR, LIQUID DISCHARGE HEAD, LIQUID DISCHARGE DEVICE, AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2021-039254, filed on Mar. 11, 2021, in the Japan Patent Office, the entire disclosure of which is hereby incorporated by reference herein.

BACKGROUND

Technical Field

Aspects of the present disclosure relate to a piezoelectric actuator, a liquid discharge head, a liquid discharge device, and a liquid discharge apparatus.

Related Art

A liquid discharge head uses a piezoelectric element substrate as an electromechanical conversion element.

The piezoelectric element substrate has a configuration in which a metal wiring layer is formed via an interlayer insulating film after forming a piezoelectric element in which a lower electrode, a piezoelectric element, and an upper electrode are individualized by patterning. The piezoelectric element substrate is bonded to a subframe in a post-process.

SUMMARY

In an aspect of this disclosure, a piezoelectric actuator includes a piezoelectric element substrate including a diaphragm, multiple piezoelectric elements each including: a first electrode on the diaphragm, a piezoelectric layer on the first electrode, and a second electrode on the piezoelectric layer, a metal wiring layer on the second electrode, the metal wiring layer including wiring patterns coupled to the multiple piezoelectric elements, and a subframe bonded to a bonding region of the piezoelectric element substrate via adhesive, wherein the subframe has a recess facing the wiring patterns in the bonding region.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
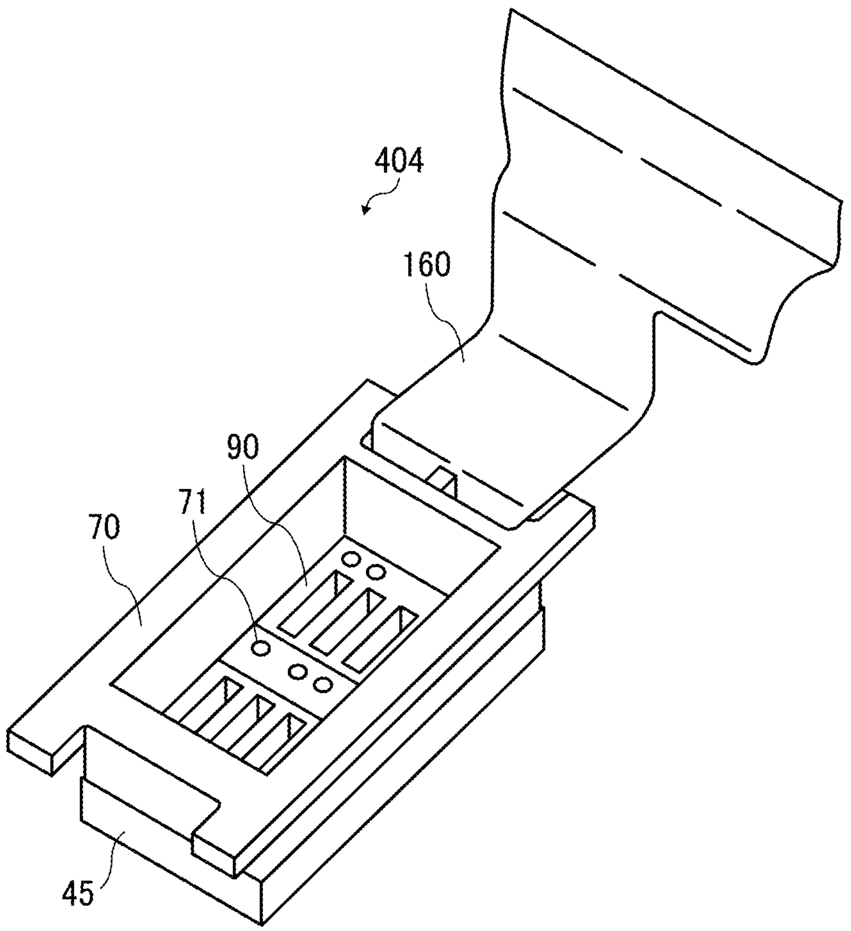
FIG. 1 is a perspective view of a liquid discharge head according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a”, “an”, and “the” are intended to include the plural forms as well, unless the context clearly indicates otherwise.

Referring to the drawings, embodiments according to the present disclosure is described below. For clarity, the following descriptions and drawings are appropriately omitted or simplified. In each of the drawings, the same reference codes are allocated to components or portions having the same structure, and redundant descriptions of the same parts may be omitted.

First, an example of a configuration of a liquid discharge head 404 including a piezoelectric element 18 according to a first embodiment of the present disclosure is described below with reference to FIGS. 1 to 4. Hereinafter, the "liquid discharge head" is simply referred to as a "head".

FIG. 1 is an exploded perspective view of the head 404.

Figure 2:
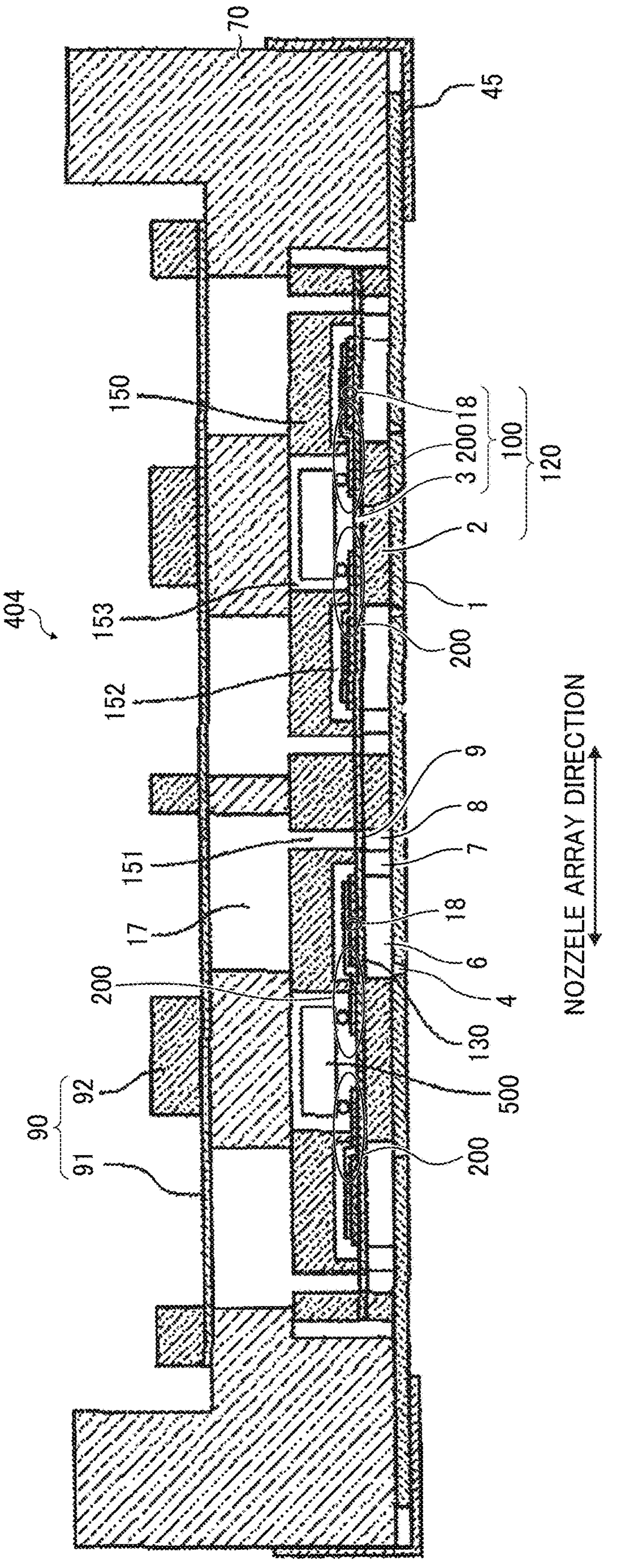
FIG. 2 is a schematic cross-sectional view of the liquid discharge head in a direction perpendicular to a nozzle array direction of the liquid discharge head.

FIG. 2 is a schematic cross-sectional view of the head 404 in a direction perpendicular to a nozzle array direction of the head 404.

Figure 3:
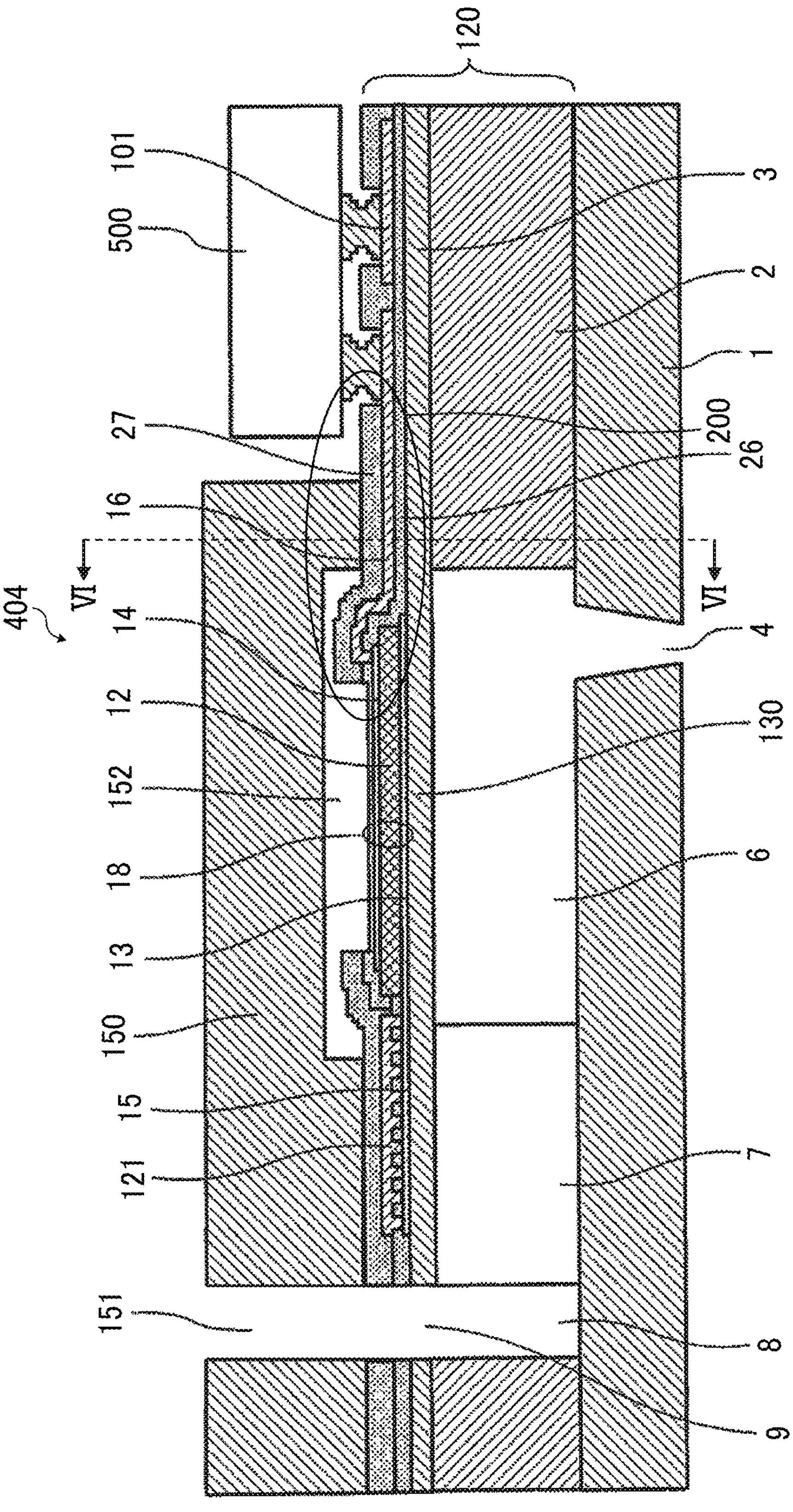
FIG. 3 is an enlarged cross-sectional view of a main part of FIG. 2.

FIG. 3 is an enlarged partial cross-sectional view of a part of the head 404 of FIG. 2.

Figure 4:
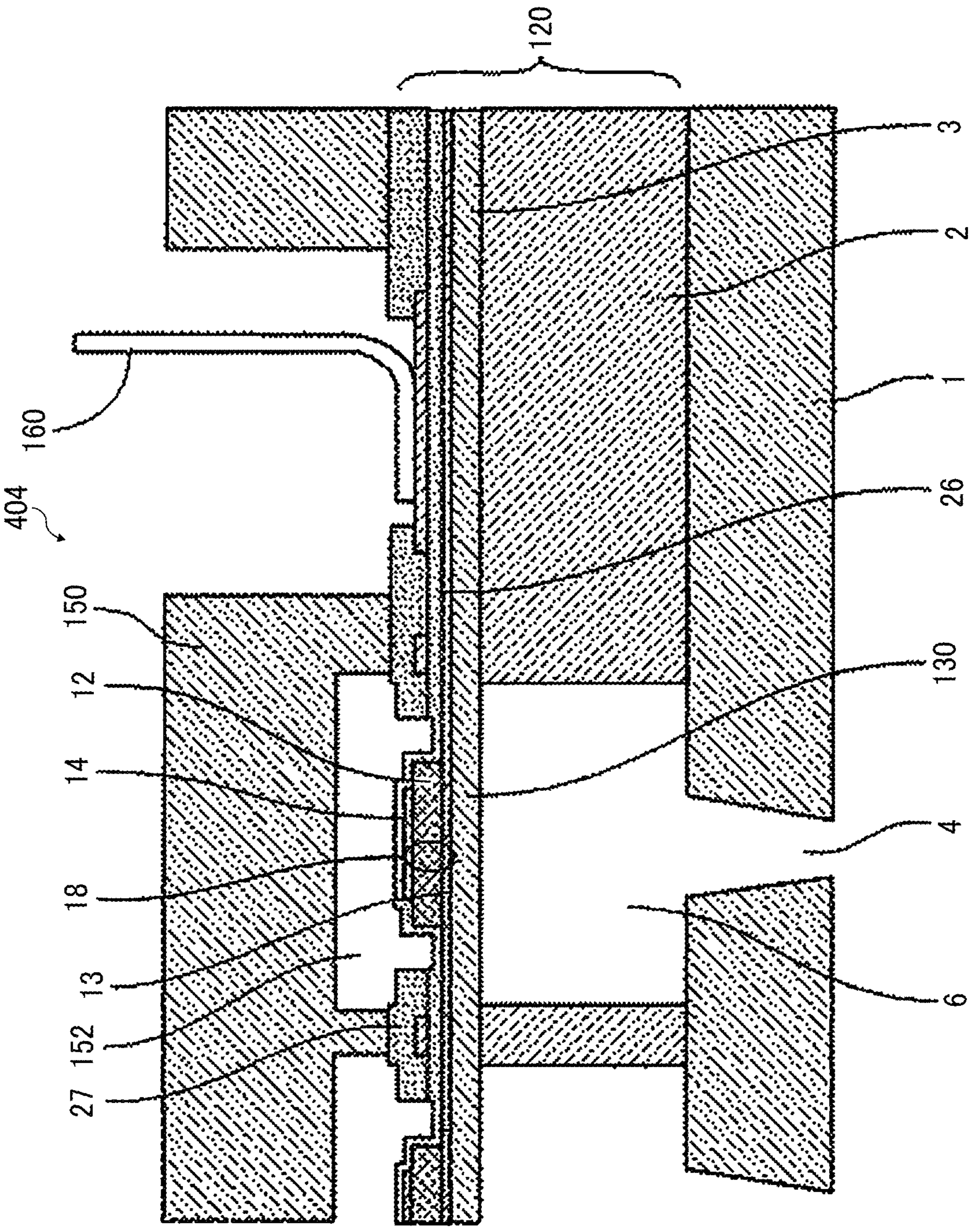
FIG. 4 is a cross-sectional view of a main part of the liquid discharge head along the nozzle array direction.

FIG. 4 is a cross-sectional view of a part of the head 404 of FIG. 3 along the nozzle array direction.

The head 404 includes a nozzle plate 1, a channel plate 2, a diaphragm 3, the piezoelectric element 18 as a pressure generating element, a subframe 150 as a holding substrate, a wiring member 160, and a frame 70 as a common chamber member.

The channel plate 2, the diaphragm 3, and the piezoelectric element 18 configure a piezoelectric actuator 120 (actuator substrate) according to the first embodiment of the present disclosure. The piezoelectric actuator 120 may be bonded to the nozzle plate 1 and the subframe ISO after the piezoelectric actuator 120 (actuator substrate) is formed as an independent member. However, the piezoelectric actuator 120 is not limited to the embodiment as described above, and the piezoelectric actuator 120 may include other members such as nozzle plate 1 or the subframe 150 as a single member.

The nozzle plate 1 includes multiple nozzles 4 to discharge a liquid. The head 404 in the first embodiment include four rows of nozzle arrays in each of which the multiple nozzles 4 are arrayed in row. Thus, the multiple nozzles 4 are formed in the nozzle plate 1 to discharge a liquid from the multiple nozzles 4.

With the nozzle plate 1 and the diaphragm 3, the channel plate 2 forms individual chambers 6 communicating with the nozzles 4, fluid restrictors 7 communicating with the individual chambers 6, and liquid inlets 8 (passages) communicating with the fluid restrictors 7.

The liquid inlets 8 communicate with a common chamber 17 formed by the frame 70 via passages 9 (supply ports) of the diaphragm 3 and openings 151 as channels of the subframe 150.

The diaphragm 3 forms a deformable vibration region 130 forming part of a wall of the individual chamber 6. The head 404 includes the piezoelectric elements 18 on a surface of the diaphragm 3 opposite to a surface that faces the individual chamber 6 in the vibration region 130. The piezoelectric elements 18 and the vibration region 130 of the diaphragm 3 form a single unit (see FIG. 3). The piezoelectric actuator 120 (actuator substrate) includes the vibration region 130 and the piezoelectric element 18. The diaphragm 3 is deformable (displaceable) by driving the multiple piezoelectric element (18).

Each of the piezoelectric elements 18 includes a first electrode 13 (upper electrode), a piezoelectric layer 12 (piezoelectric body), and a second electrode 14 (lower electrode) laminated in the above-described order from the vibration region 130. The head 404 includes an insulation film 26 on the piezoelectric elements 18.

The first electrode 13 serves as a common electrode of the multiple piezoelectric elements 18 is coupled to a common-electrode power-supply wiring pattern 121 via a common wiring 15. As illustrated in FIG. 4, the first electrode 13 is a single electrode layer formed across an entire of the piezoelectric elements 18 in the nozzle array direction.

The second electrode 14 serving as an individual electrode of each piezoelectric element 18 is coupled to a driver integral circuit 500 (driver IC 500) serving as a drive circuit via an individual wiring 16.

The individual wirings 16 are multiple individual wirings respectively coupled to the multiple piezoelectric elements 18 and are formed of the metal wiring layer. The head 404 includes an insulation film 27 on the metal wiring layer. Details of the meal wiring layer are to be further described below in each embodiment.

The driver 1C 500 is mounted on the piezoelectric actuator 120 (actuator substrate) by a method such as a flip-chip bonding to cover regions between rows of the piezoelectric elements 18.

The driver IC 500 mounted on the piezoelectric actuator 120 (actuator substrate) is connected to an individual-electrode power-supply wiring pattern 101 to which a drive waveform (drive signal) is supplied.

At one end of the wiring member 160, a wire is electrically connected to the driver IC 500. The opposite end of the wiring member 160 is connected to a controller mounted to an apparatus body.

The subframe 150 is provided on the piezoelectric actuator 120 (actuator substrate) as described above. The subframe 150 has the opening 151 serving as a channel communicating the common chamber 17 with the individual chamber 6, a housing recess 152 housing the piezoelectric element 18, and an opening 153 housing the driver IC 500.

The subframe 150 is bonded to the diaphragm 3 side surface of the piezoelectric actuator 120 (actuator substrate) with an adhesive.

The frame 70 includes the common chamber 17 to supply liquid to each individual chamber 6. The head 404 according to the first embodiment respectively includes four common chambers 17 for four nozzle arrays of nozzles 4. A liquid of a desired color is supplied from an exterior of the head 404 to the common chamber 17 via a supply port 71.

The head 404 includes a damper unit 90 bonded to the frame 70. The damper unit 90 includes a damper 91 and damper plates 92. The damper 91 is deformable and forms pan of wall of the common chambers 17. The damper plates 92 reinforce the damper 91.

The frame 70 is bonded to an outer peripheral portion of the nozzle plate 1 to accommodate the piezoelectric actuator 120 (actuator substrate) and the subframe 150, thus forming the frame 70 of this head 404.

Further, the head 404 includes a nozzle cover 45 to cover a peripheral edge of the nozzle plate 1 and a part of the outer circumferential surface of the frame 70.

In the head 404, voltage is applied from the driver IC 500 to a portion between the second electrode 14 and the first electrode 13 of the piezoelectric element 18. The piezoelectric layer 12 (piezoelectric body) expands in an electrode lamination direction, that is, an electrolysis direction (height direction in FIG. 3), and contracts in a direction parallel to the vibration region 130 (horizontal direction in FIG. 3).

At this time, since the first electrode 13 side of the piezoelectric element 18 is restricted by the vibration region 130, a tensile stress is generated on the first electrode 13 side of the vibration region 130. The vibration region 130 thereby bends toward the individual chamber 6 and pressurizes a liquid in the individual chamber 6 so that the liquid is discharged from the nozzle 4.

Next, the piezoelectric actuator 120 according to the first embodiment is described below in each embodiment.

The individual wiring 16 (wiring pattern) may be crushed by the foreign substance when the piezoelectric element substrate 100 is bonded to the subframe 150 via an adhesive as described above and when there is a foreign substance in at least one of the individual wirings 16 (wiring pattern) of the piezoelectric element substrate 100 or a bonding region of the subframe 150 facing the individual wiring 16 (wiring pattern).

Therefore, a piezoelectric actuator 120 according to the first embodiment of the present disclosure includes a recess 154 in a region facing the individual wiring 16 (wiring pattern) formed on the piezoelectric element substrate 100 on the subframe 150 side in a bonding region between the piezoelectric element substrate 100 and the subframe 150 bonded via an adhesive.

The piezoelectric actuator 120 according to the first embodiment includes the diaphragm (substrate), the first electrode 13, the piezoelectric layer 12 (electromechanical transducer film), and the second electrode 14 laminated on the diaphragm 3 (substrate). The piezoelectric actuator 120 includes the piezoelectric element substrate 100 and the subframe 150.

The piezoelectric element substrate 100 includes individualized multiple piezoelectric elements 18, the metal wiring layer 200 forming a wiring pattern connected to the multiple piezoelectric elements 18 on an upper layer of the multiple piezoelectric elements 18. The subframe 150 is bonded to the piezoelectric element substrate 100 via an adhesive 29. The piezoelectric element substrate 100 includes the bonding region to be bonded to the subframe 150 on a side surface on which the piezoelectric element 18 is laminated.

The subframe 150 has a recess 154 in a region facing the bonding region between the piezoelectric element substrate 100 and the subframe 150. Each of elements as described above such as the diaphragm 3, the first electrode 13, piezoelectric layer 12, the second electrode 14, piezoelectric element 18, metal wiring layer 200, and the subframe 150 corresponds to a configuration illustrated in FIG. 3 or FIGS. 5 and 6 described below as an example.

The piezoelectric actuator 120 according to the first embodiment has a mechanism to generate a pressure in the vibration region 130 of the diaphragm 3. The piezoelectric actuator 120 includes at least the piezoelectric element substrate 100 as an electromechanical conversion element.

The diaphragm 3 is a substrate on which the piezoelectric element 18 is laminated. For example, the diaphragm 3 (vibration member) is used as the substrate. Thus, the piezoelectric element 18 is formed on the diaphragm 3 to form the piezoelectric element substrate 100. That is, the piezoelectric element substrate 100 includes the piezoelectric element 18 and the diaphragm 3.

The subframe 150 is a substrate bonded to the piezoelectric element substrate 100 on a side (surface) of the piezoelectric element substrate 100 opposite to the diaphragm 3. The piezoelectric element 18 is laminated on the side (surface) of the piezoelectric element substrate 100 on which the subframe 150 is bonded. For example, the subframe 150 serves as a protective substrate.

The actuator substrate described above is an example of a piezoelectric actuator 120.

In each embodiment described below, the piezoelectric actuator 120 includes the piezoelectric element substrate 100 and the subframe 150 as an example. Further, the piezoelectric actuator 120 is described below using the diaphragm 3 as an example of a substrate and the subframe 150 as an example of a subframe.

First Embodiment

Figure 5:
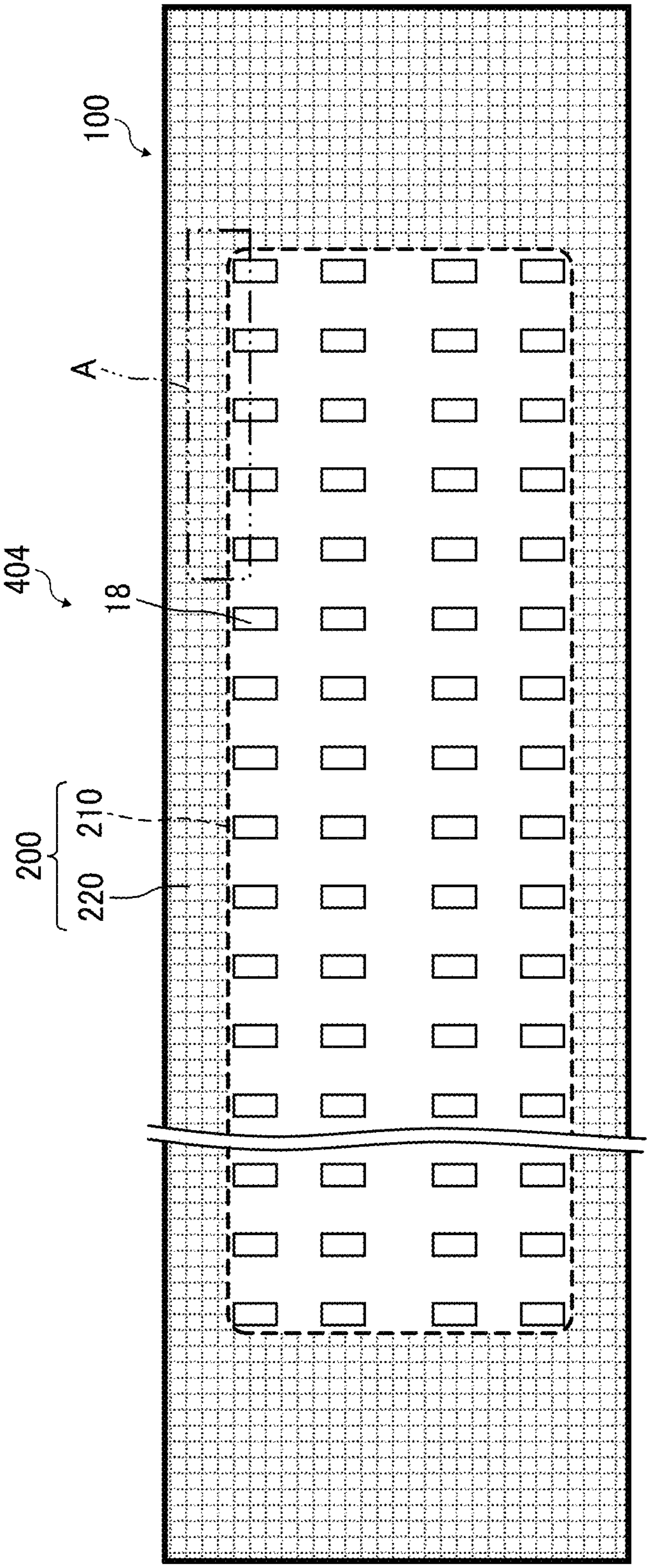
FIG. 5 is a plan view of an example of a metal wiring layer formed on a piezoelectric element substrate according to the first embodiment.

FIG. 5 is a plan view of an example of the metal wiring layer 200 formed on the piezoelectric element substrate 100 according to the first embodiment.

FIG. 5 schematically illustrates multiple wiring regions of the metal wiring layer 200 formed on the piezoelectric element substrate 100 and an arrangement of the multiple piezoelectric elements 18.

The piezoelectric element substrate 1W is bonded to the subframe 150 on the side opposite to the diaphragm 3. Therefore, the piezoelectric element substrate 100 includes the bonding region in the metal wiring layer 200.

The metal wiring layer 200 is formed by forming the individual wirings 16 (wiring pattern) connected to the multiple piezoelectric elements 18 on the diaphragm 3 via the insulation film 26 (insulation layer). As described above, the individual wiring 16 is a wiring that connects the second electrode 14 serving as an individual electrode of the piezoelectric element 18 and the driver IC 500.

The metal wiring layer 200 is divided into at least a first wiring region 210 and a second wiring region 220 to form wiring patterns.

The first wiring region 210 is a region in which a wiring pattern region is disposed. The wiring patterns serving as the individual wirings 16 for the multiple piezoelectric elements 18 are formed in the wiring pattern region. Specifically, the individual wiring patterns corresponding to the second electrodes 14 as the individual electrodes of the piezoelectric elements 18 are formed in the first wiring region 210. The individual wiring patterns are respectively formed for the multiple piezoelectric elements 18 in the piezoelectric actuator 120 (actuator substrate). In the present specification, the first wiring region 210 may be a region in which at least the individual wiring patterns are formed. For example, a wiring pattern of a connection terminal to energize (electrify) the individual wirings 16 may be formed in the first wiring region 210.

The second wiring region 220 is disposed around a periphery of the first wiring region 210 and is a region in which a bonding region to be bonded to the subframe 150 is disposed. The second wiring region 220 may be provided separately with the first wiring region 210. The second wiring region 220 is a bonding region in which the metal wiring layer 200 and the subframe 150 are bonded. A part of the second wiring region 220 includes a part of the individual wirings 16 formed in the first wiring region 210 side. For example, the individual wirings 16 extend from the first wiring region 210 to the second wiring region 220. The second wiring region 220 may be provided in a region along an outer periphery of the piezoelectric element substrate 100 (see FIG. 5).

Figure 6:
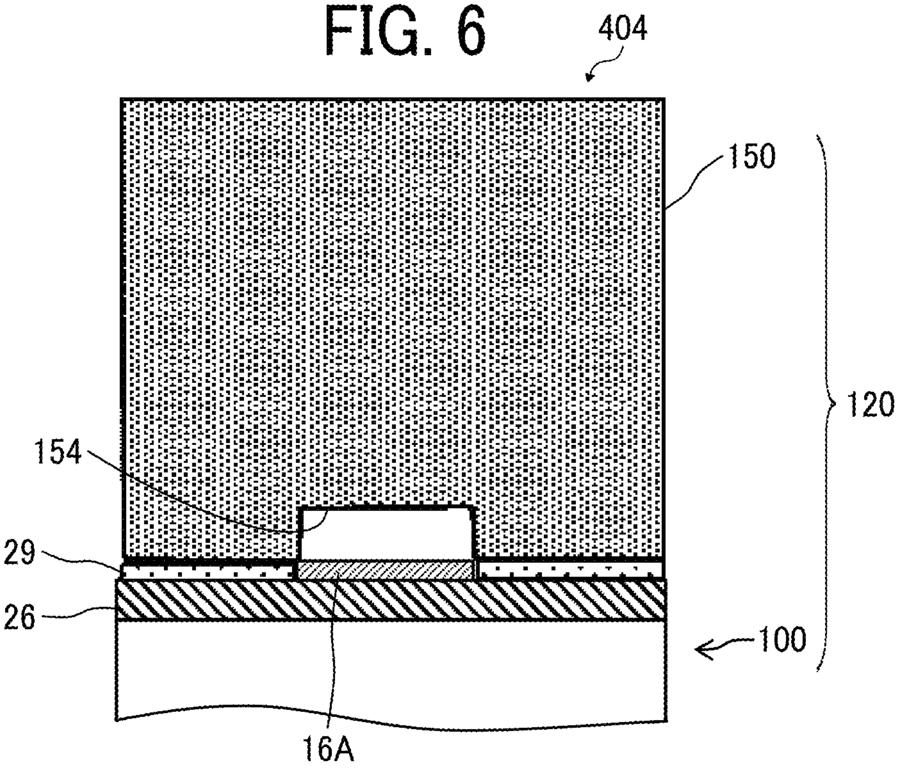
FIG. 6 is a schematic cross-sectional side view of an example of a bonding region between the piezoelectric element substrate and a subframe of a piezoelectric actuator according to the first embodiment.

FIG. 6 is a schematic cross-sectional side view of an example of a bonding region between the piezoelectric element substrate 100 and the subframe 150 of the piezoelectric actuator 120 according to the first embodiment.

FIG. 6 illustrates an example of a state in which the piezoelectric element substrate 100 and the subframe 150 are bonded to each other via the adhesive 29.

FIG. 6 is a cross-sectional view taken along a line VI-VI indicated in FIG. 3 illustrating a part in which the individual wiring 16A is disposed as an example of the wiring pattern formed in the second wiring region 220. Further, the insulation film 26 and the individual wiring 16A are illustrated as main portions of the bonding region of the piezoelectric element substrate 100, and details of other configurations are omitted.

Here, the individual wiring 16A is distinguished from other individual wirings 16 by forming the individual wiring 16A in the second wiring region 220. The individual wirings 16 are continuously formed in the first wiring region 210 and the second wiring region 220.

The subframe 150 has at least a recess 154 in a region facing the individual wiring 16A in the bonding region between the piezoelectric element substrate 100 and the subframe 150. In this manner, the piezoelectric element substrate 100 and the subframe 150 can be bonded without bonding the individual wiring 16A to the subframe 150 with the adhesive 29.

The recess 154 of the subframe 150 is provided in a region of the bonding region of the subframe 150 side. The recess 154 is located above the wiring pattern in the bonding region of the piezoelectric element substrate 100.

The subframe 150 has the recess 154 in a region facing the individual wiring 16A in the bonding region of the piezoelectric element substrate 100. The region facing the recess 154 in the bonding region of the piezoelectric element substrate 100 becomes a portion not to be bonded to the subframe 150.

Figure 7B:
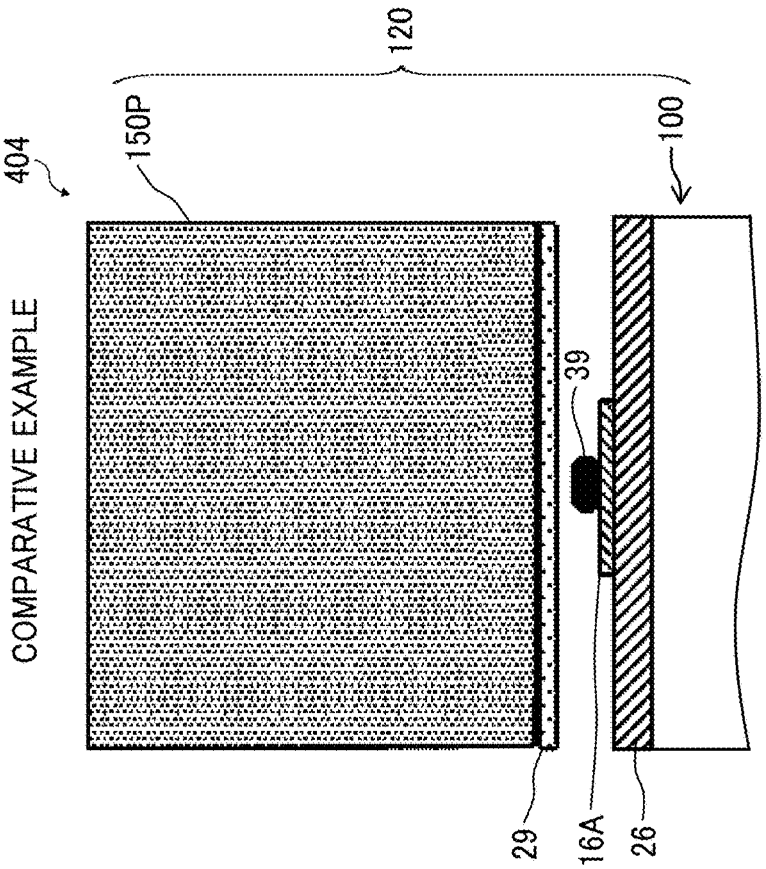
FIGS. 7A and 7B are cross-sectional side views of the piezoelectric actuator according to the first embodiment of the present disclosure and a comparative example to describe an effect of the piezoelectric actuator according to the first embodiment.
Figure 7A:
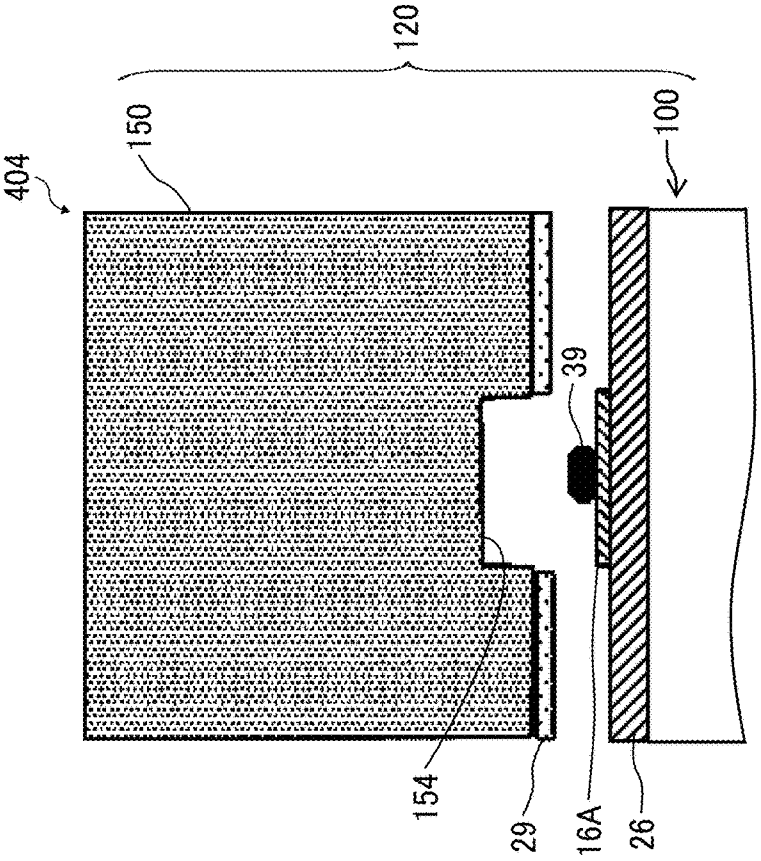

FIGS. 7A and 7B are cross-sectional side views of the piezoelectric actuator 120 according to the first embodiment of the present disclosure.

FIG. 7A is a cross-section side view of the bonding region of the piezoelectric actuator 120 according to the first embodiment.

FIG. 7B is a cross-section side view of a bonding region of a piezoelectric actuator 120 of a comparative example.

FIGS. 7A and 7B illustrate an example of a state before the piezoelectric element substrate 100 and the subframe 150 and 150P are bonded using the same cross-section as illustrated in FIG. 6.

In Comparative Example 1 in FIG. 7B, the subframe 150P does not has the recess 154 in a region facing the individual wiring 16A. As illustrated in FIG. 7B, the subframe 150P has a flat lower surface without the recess 154.

When foreign matter 39 is mixed into any position of the metal wiring layer 200, the subframe 150 does not sandwich the foreign matter 39 on the individual wiring 16A between the subframe 150 and the piezoelectric element substrate 100 in the piezoelectric actuator 120 according to the first embodiment. The foreign matter 39 can enter the recess 154 of the subframe 150. Therefore, the piezoelectric actuator 120 can keep the wiring pattern and also keep a function of the piezoelectric element 18. Therefore, the piezoelectric actuator 120 can secure a yield of the piezoelectric actuator 120 (actuator substrate) in a manufacturing process of the piezoelectric actuator 120.

Conversely, the piezoelectric actuator in the comparative example sandwiches the foreign matter 39 between the subframe 150 and the individual wiring 16A on the piezoelectric element substrate 100 since the subframe 150P is bonded to the individual wiring 16A with the adhesive 29. Therefore, the wiring pattern forming the metal wiring layer 200 may be broken. Therefore, the individual piezoelectric actuator 120 connected to the wiring pattern loses a function as the piezoelectric element 18, and at the same time, a yield of the piezoelectric actuator 120 in a manufacturing process decreases.

As described above, the piezoelectric actuator 120 according to the first embodiment has the recess 154 in the subframe 150 so that the wiring pattern of the metal wiring layer 200 and the subframe 150 are not bonded to each other. The recess 154 of the subframe 150 is disposed at the bonding region of the piezoelectric element substrate 100. The recess 154 can prevent an occurrence of a phenomenon in which the wiring pattern is crushed by the foreign matter 39 on the metal wiring layer 200 or on the subframe 150 during bonding of the piezoelectric element substrate 100 and the subframe 150. Therefore, the piezoelectric actuator 120 according to the first embodiment can secure a function and reliability as the piezoelectric actuator 120 and improve a yield of manufacturing process of the piezoelectric actuator 120 (actuator substrate).

Second Embodiment

A preferred position of the recess 154 in the subframe 150 of the piezoelectric actuator 120 according to a second embodiment is described below with reference to FIG. 5.

An outer peripheral portion of a piezoelectric element formation region in the piezoelectric element substrate 100 is used as the bonding region between the piezoelectric element substrate 100 and the subframe 150. The piezoelectric element formation region is a large-area region on which the piezoelectric element 18 is formed in the piezoelectric element substrate 100. However, an inner peripheral end of the bonding region on the subframe 150 side is structurally formed to partially cover the wiring pattern formed in the first wiring region 210 of the metal wiring layer 200.

The second wiring region 220 of the metal wiring layer 200 becomes the bonding region between the piezoelectric element substrate 100 and the subframe 150. However, the second wiring region 220 has a specific region 221 (see FIG. 8) in which the wiring patterns of the multiple individual wirings 16 or the like are arranged from the first wiring region 210 to the second wiring region 220.

The specific region 221 is in the vicinity of a boundary with the first wiring region 210 in the second wiring region 220 (bonding region). The specific region 221 is a region contacting with the first wiring region 210 (wiring pattern region) and is a portion in which the second wiring region 220 overlaps with the first wiring region 210. Further, the specific region 221 is, for example, a region in which a wiring pattern such as a part of the individual wirings 16 or the connection terminals are arranged.

For the above reasons, the recess 154 may be disposed at the inner peripheral end of the bonding region on the subframe 150 side and above the specific region 221 disposed at an end portion of the bonding region of the piezoelectric element substrate 100.

Figure 8:
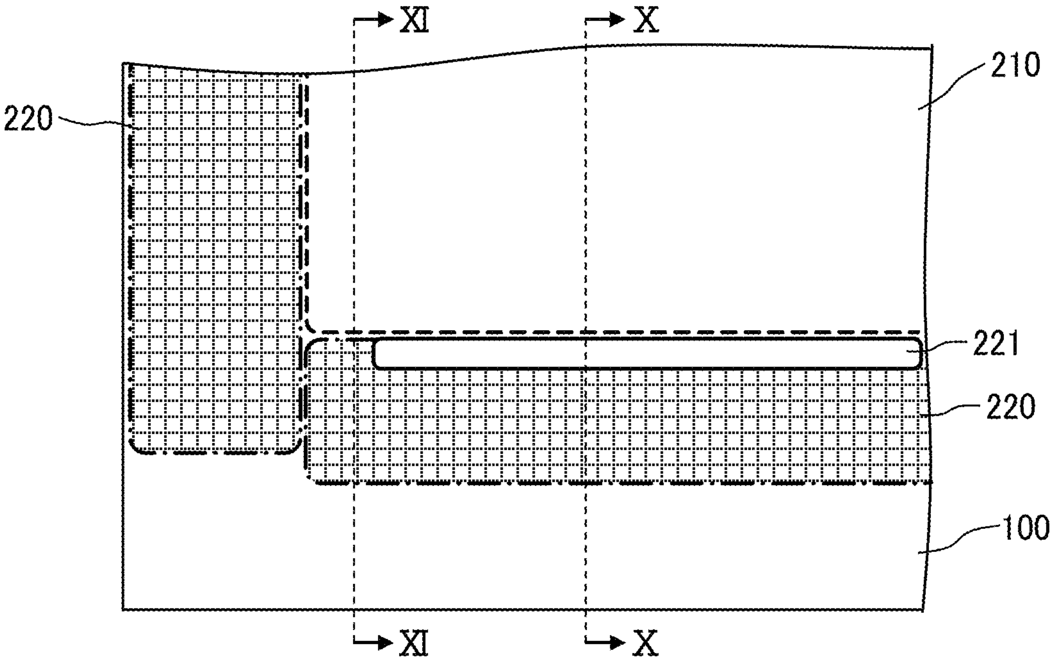
FIG. 8 is a plan view of an example of a bonding region of the metal wiring layer of the piezoelectric element substrate according to a second embodiment of the present disclosure.

FIG. 8 is a plan view of an example of the bonding region of the metal wiring layer 200 of the piezoelectric element substrate 100 according to the second embodiment of the present disclosure.

Figure 9:
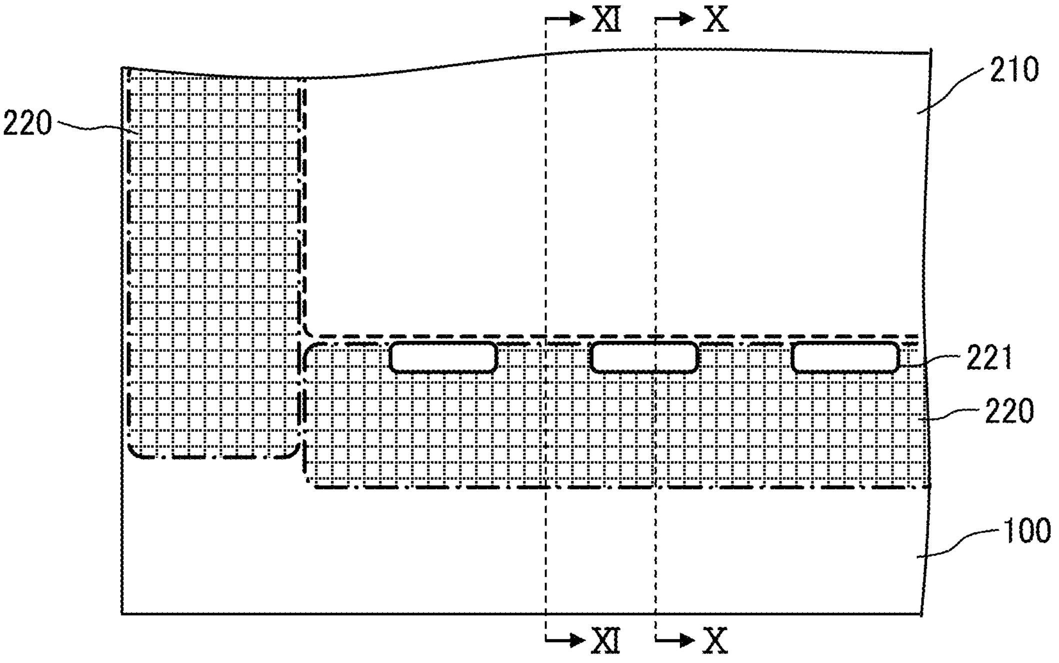
FIG. 9 is a plan view of another example of the bonding region of the metal wiring layer of the piezoelectric element substrate according to the second embodiment.

FIG. 9 is a plan view of another example of the bonding region of the metal wiring layer 200 of the piezoelectric element substrate 100 according to the second embodiment of the present disclosure.

FIGS. 8 and 9 illustrate a part of the first wiring region 210 and the second wiring region 220 of the metal wiring layer 200 laminated on the piezoelectric element substrate 100. The piezoelectric elements 18 disposed in the first wiring region 210 are omitted in FIGS. 8 and 9.

FIGS. 8 and 9 illustrate an example of the specific region 221 disposed at a position facing the recess 154 of the subframe 150.

The wiring pattern of the specific region 221 may be disposed at the position facing the recess 154 of the subframe 150 in the piezoelectric element substrate 100.

Figure 10B:
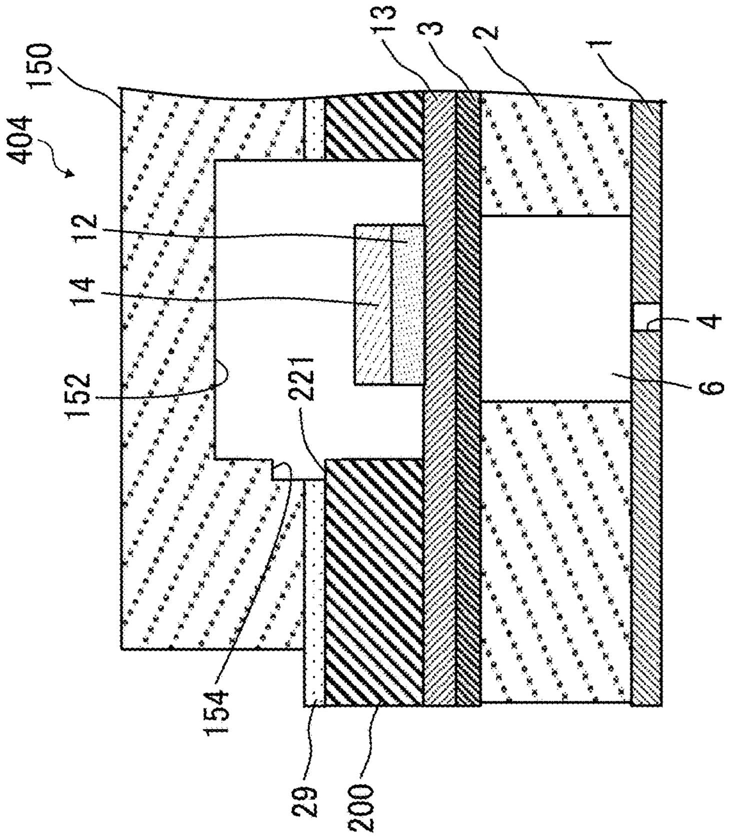
FIGS. 10A and 10B each illustrates an example of a cross section of a part of the liquid discharge head in which the subframe has the recess.

FIGS. 0A and 10B each illustrates an example of a cross section of a part of the head 404 in which the subframe 150 have the recess 154 at a position above the specific region 221.

Figure 11:
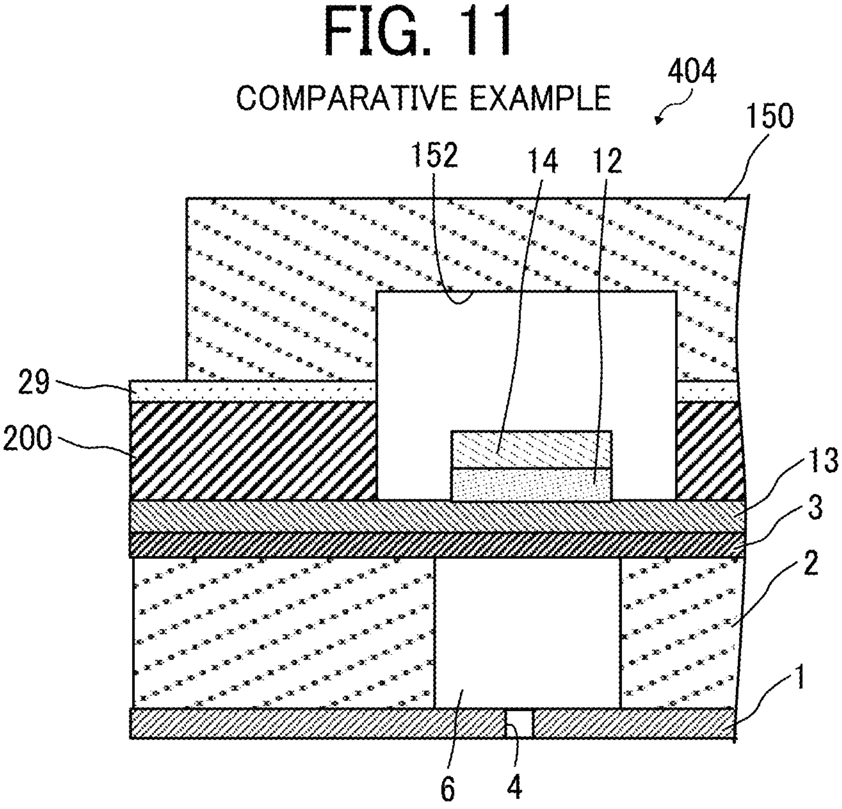
FIG. 11 illustrates a comparative example of a cross section of a part of the liquid discharge head in which the subframe does not have the recess.

FIG. 11 illustrates a comparative example of a cross section of a part of the head 404 in which the subframe 150 does not have the recess 154 at the position above the specific region 221.

Figure 10A:
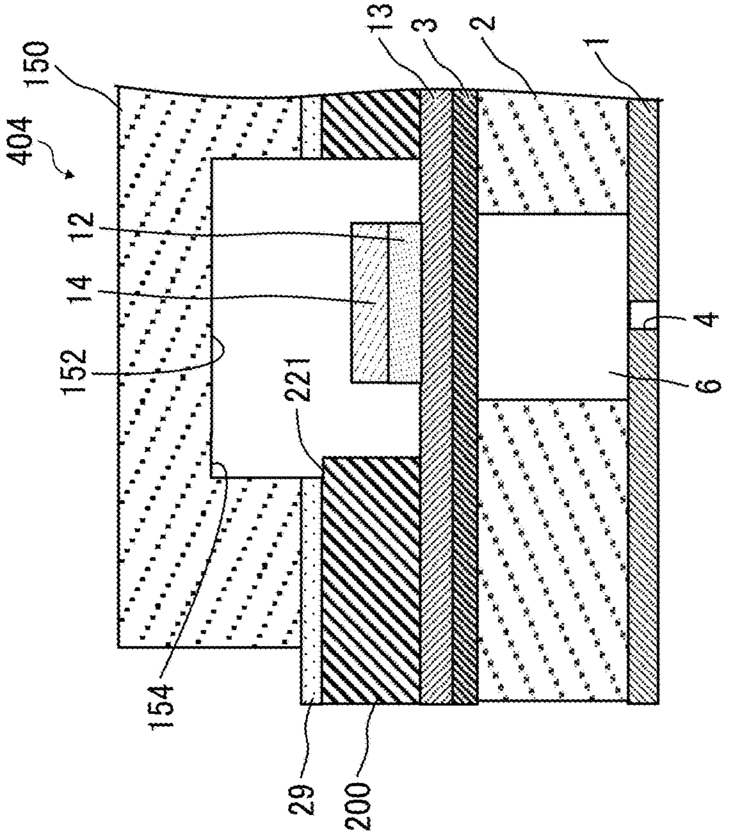

FIGS. 10A and 10B are examples of cross-sectional side views of the heads 404 along a line X-X illustrated in FIGS. 8 and 9.

FIG. 11 is a comparative example of a cross-sectional side view of the head 404 along a line XI-XI illustrated in FIGS. 8 and 9.

FIG. 10A illustrates an example in which a depth of the recess 154 is made the same as a depth of the housing recess 152.

FIG. 10B illustrates an example in which the depth of the recess 154 is made shallower than the depth of the housing recess 152. The depths of the recess 154 and the housing recess 152 may be set in consideration of ease of manufacturing, strength of the subframe 150, and the like.

As described above, the piezoelectric actuator 120 according to the second embodiment has the recess 154 in the subframe 150 above the specific region 221 in the second wiring region 220.

With the above-described configuration, in addition to the advantageous effects of the first embodiment, the piezoelectric actuator 120 according to the second embodiment can further prevent a phenomenon in which the wiring pattern disposed in the specific region 221 is crushed by the foreign matter 39 when the piezoelectric element substrate 100 and the subframe 150 are bonded.

Third Embodiment

Figure 12C:
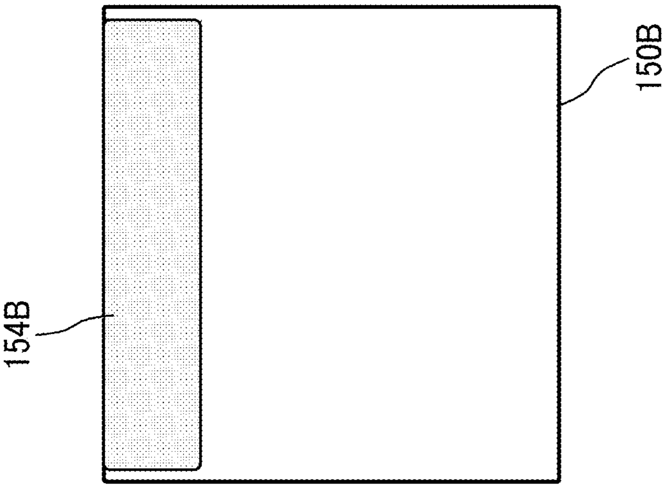
FIGS. 12A to 12C are plan views of the piezoelectric actuator according to a third embodiment of the present disclosure.
Figure 12B:
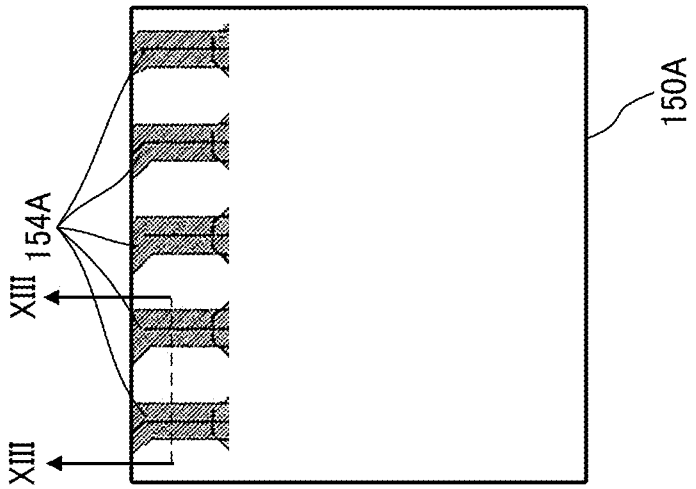
Figure 12A:
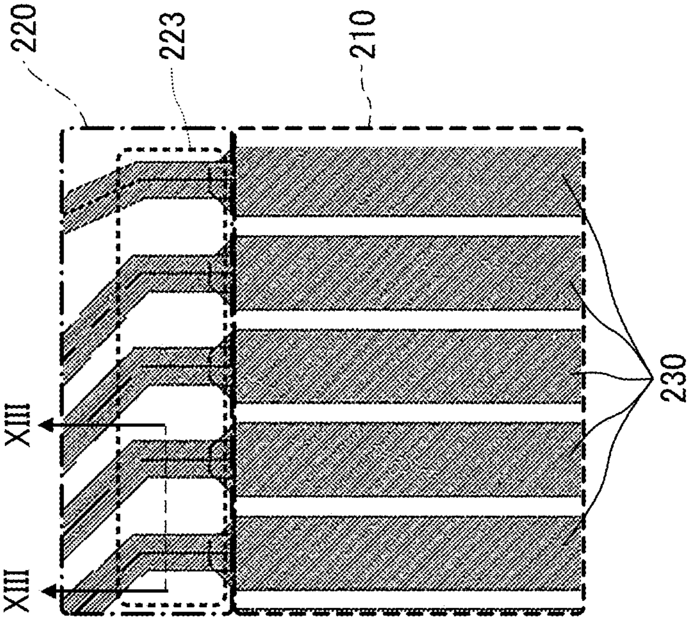

The piezoelectric actuator 120 according to the third embodiment is described blow with reference to FIGS. 12A to 12C illustrating another shape of the recess 154 in the subframe 150 in addition to the above-described embodiments.

The recess 154 may have a shape similar to a shape of the wiring pattern formed in the metal wiring layer 200 opposed to the recess 154 in consideration of ensuring a bonding strength in the bonding region and preventing the foreign matter 39 from being caught between the subframe 150 and the piezoelectric element substrate 100.

FIGS. 12A to 12C are plan views of the piezoelectric actuator 120 according to the third embodiment of the present disclosure.

FIG. 12A is a plan view of an example of the wiring pattern 230.

FIG. 12B is a plan view of an example of the recess 154A in the subframe 150 along the wiring pattern 230.

FIG. 12C is a plan view of an example of the recess 154B in the subframe 150.

The recess 154B is formed in a range surrounding the wiring pattern 230 present in the specific region 221 as a variation.

FIG. 12A is an enlarged partial plan view of an area A surrounded by two dot chain line in FIG. 5.

In FIG. 12A, the wiring patterns 230 are illustrated by mesh portions.

In FIG. 12A, a specific region 223 is illustrated by a region surrounded by a broken line. The wiring pattern 230 is formed over (across) the first wiring region 210 and the second wiring region 220.

In FIGS. 12B and 12C, the mesh portions are set as an arrangement positions of the recesses 154A and 154B at which the recesses 154A and 154B are disposed.

FIGS. 12B and 12C illustrate shapes of the recesses 154A and 1548 when the subframes 150A and 150B are viewed from above toward the second wiring region 220.

Figure 13:
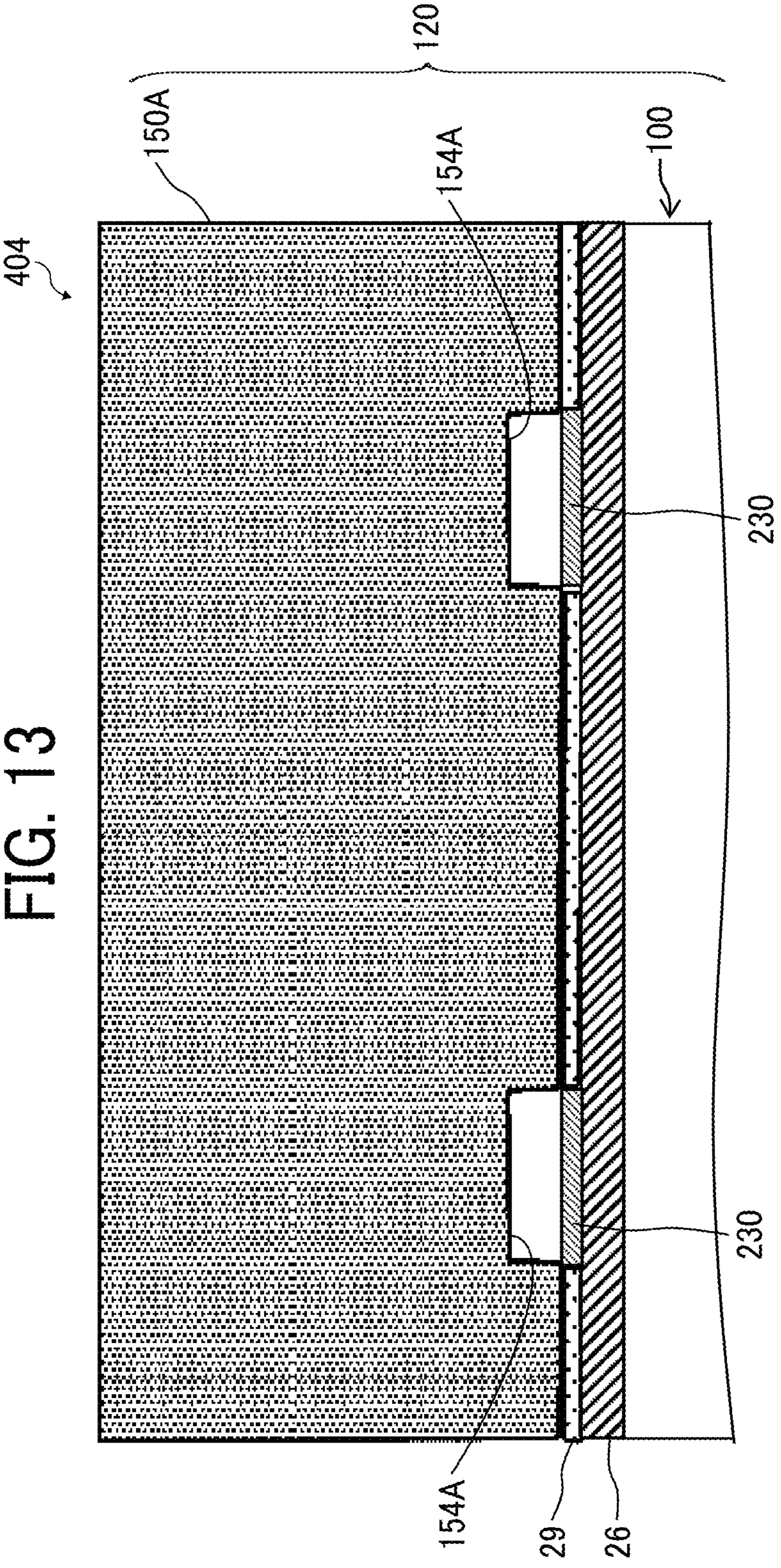
FIG. 13 illustrates an example of the bonding region between the piezoelectric element substrate and the subframe of the piezoelectric actuator according to the third embodiment.

FIG. 13 illustrates an example of the bonding region between the piezoelectric element substrate 100 and the subframe 150 of the piezoelectric actuator 120 according to the third embodiment.

FIG. 13 is a cross-sectional view of the piezoelectric actuator 120 along a line XIII-XIII illustrated in FIG. 12B.

FIG. 13 illustrates an example of a bonded state in the specific region 223 between the piezoelectric element substrate 100 on which the wiring pattern 230 of FIG. 12A is formed and the subframe 150A including the recess 154A of FIG. 128.

The subframe 150A has the recesses 154A having shapes matched with shapes of the wiring patterns 230 in the specific region 223. Thus, the wiring patterns 230 includes multiple wiring patterns 230 corresponding to the multiple piezoelectric elements 18. The recess 154 includes multiple recesses 154A corresponding to the multiple wiring patterns 230, and the multiple recesses 154A are respectively facing the multiple wiring patterns 230 in the second wiring region 220 (bonding region). The multiple recesses 154A respectively have shapes matched with shapes of the wiring patterns 230.

In the above-described manner, the head 404 can reduce an arrangement area of the recess 154A of the subframe 150A to be smaller than an arrangement area of the recess 154B of subframe 150B. Therefore, the head 404 can increase a bonding area between the piezoelectric element substrate 100 and the subframe 150 to increase a bonding strength between the piezoelectric element substrate 100 and the subframe 150.

On the other hand, the subframe 150B has the recess 154B having a shape covering an area in which the recess 154B surrounds the multiple wiring patterns present in the specific region 223. Specifically, the recess 154B has one rectangle area that covers the multiple wiring patterns 230 in the specific region 223. Thus, the recess 154B covers an area surrounding the multiple wiring patterns 230 in the specific region 223. The recess 154B may have a circular, triangular, or any other shapes other than the rectangular shape to cover the multiple wiring patterns 230.

Since the shape of the recess 154B of the subframe 150B is simpler than the shape of the recess 154A of the subframe 150A as described above, it is easy to form the recess 154B of the subframe 1508 compared to the recess 154A of the subframe 150A. Further, the recess 154B of the subframe 150B can increase a degree of freedom of arrangement of the wiring pattern 230 in the specific region 223 in the piezoelectric element substrate 100.

As described above, the piezoelectric actuator 120 according to the third embodiment has the recess 154A formed in the subframe 150A having the same shape as the wiring patterns of the metal wiring layer 200 of the piezoelectric element substrate 100.

In this way, it is possible to form a bonding interface on the metal wiring layer 200 that does not cause biting of the foreign matter 39 between the subframe 150 and the piezoelectric element substrate 100. Thus, the piezoelectric actuator 120 can prevent biting of the foreign matter 39 between the subframe 150 and the piezoelectric element substrate 100 similarly to each of the embodiments described above. Further, the piezoelectric actuator 120 can secure a maximum bonding area between the piezoelectric element substrate 100 and the subframe 150. Thus, the piezoelectric actuator 120 can increase a bonding force and improve the reliability of the bonding interface.

Other Embodiment

The shapes of the specific regions 221 and 223 and the recess 154 described in the above embodiments are examples, and are not limited to the examples as described above.

The piezoelectric actuator 120 according to each of the embodiments described above may include an insulation layer formed on the metal wiring layer 200 in the bonding region between the piezoelectric element substrate 100 and the subframe 150. For example, the piezoelectric actuator 120 may have a configuration in which the insulation layer (the insulation film 27, for example) is formed on an upper layer of the individual wirings 16 that are formed on the metal wiring layer 200 as in a configuration illustrated in FIGS. 2 and 3.

The piezoelectric element substrate 100 in one embodiment may use the multiple piezoelectric elements 18 as a sensor.

In the various configuration examples of the piezoelectric element substrate 100 described above, the multiple piezoelectric elements 18 function as individualized electromechanical transducer elements.

Therefore, the head 404 according to the above embodiments can secure a function as the piezoelectric actuator 120 (actuator substrate), and a yield of manufacturing process of the piezoelectric actuator 120 (actuator substrate).

Next, a liquid discharge device 440 and a liquid discharge apparatus 1000 according to a fourth embodiment of the present disclosure are described below.

The liquid discharge device 440 according to the fourth embodiment includes the head 404 according to the above-described embodiments of the present disclosure.

Further, the liquid discharge device 440 includes the head 404 and at least one of: a head tank 441 that stores liquid to be supplied to the head 404; a carriage 403 on which the head 404 is mounted; a supply unit that supplies the liquid to the head 404; a maintenance unit 420 that maintains the head 404; and a main scan moving unit 493 to move the head 404 in a main scanning direction to form a single unit. The main scanning direction is indicated by arrow MSD in FIG. 14.

The liquid discharge apparatus 1000 according to the fourth embodiment of the present disclosure includes the head 404 described in above embodiments and liquid discharge device 440 according to the fourth embodiment of the present disclosure.

An example of the liquid discharge apparatus 1000 according to the fourth embodiment of the present disclosure is described in detail below with reference to FIGS. 14 and 15.

Figure 14:
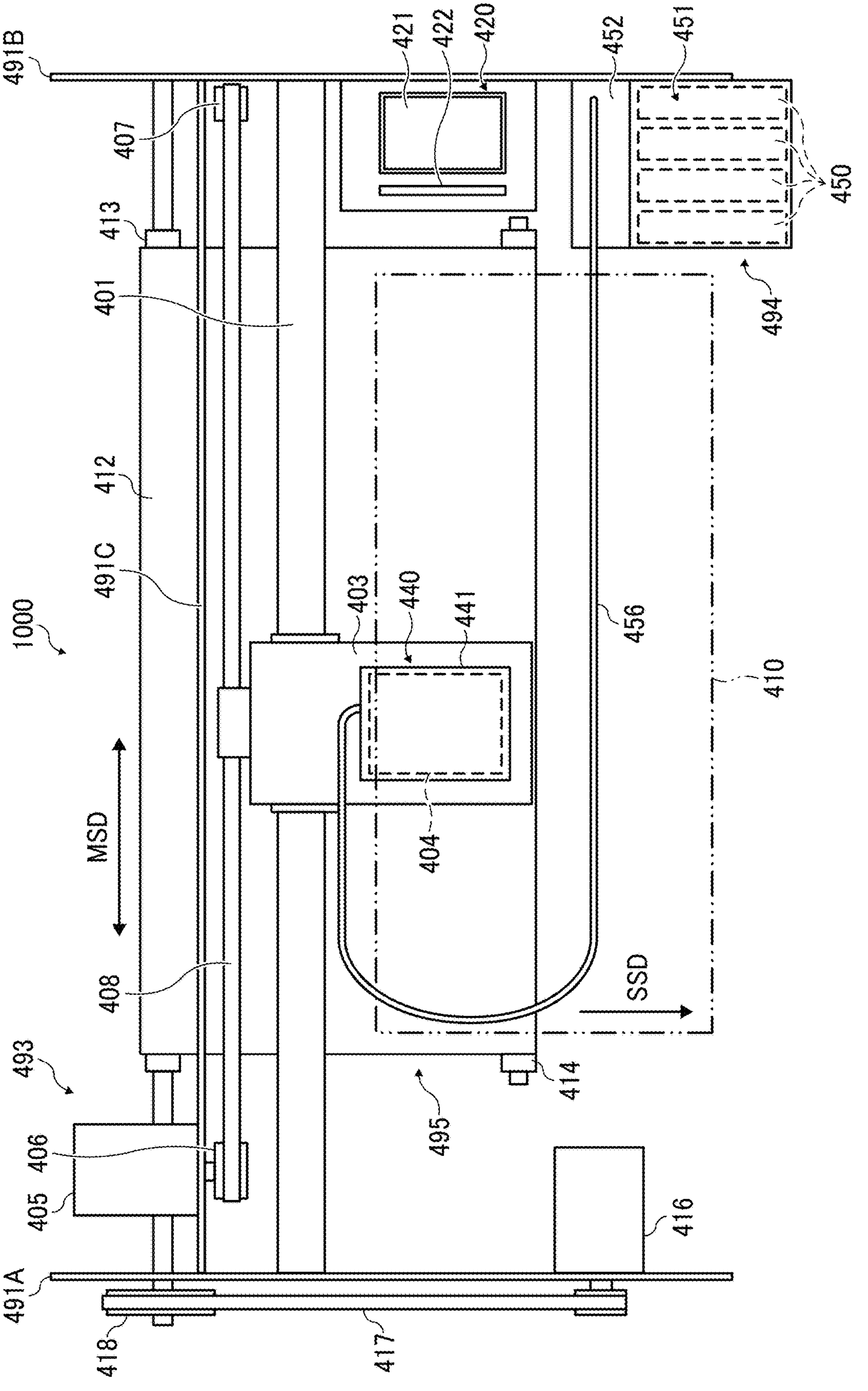
FIG. 14 is a plan view of a main part of a liquid discharge apparatus according to a fourth embodiment of the present disclosure.

FIG. 14 is a plan view of a portion of the liquid discharge apparatus 1000.

Figure 15:
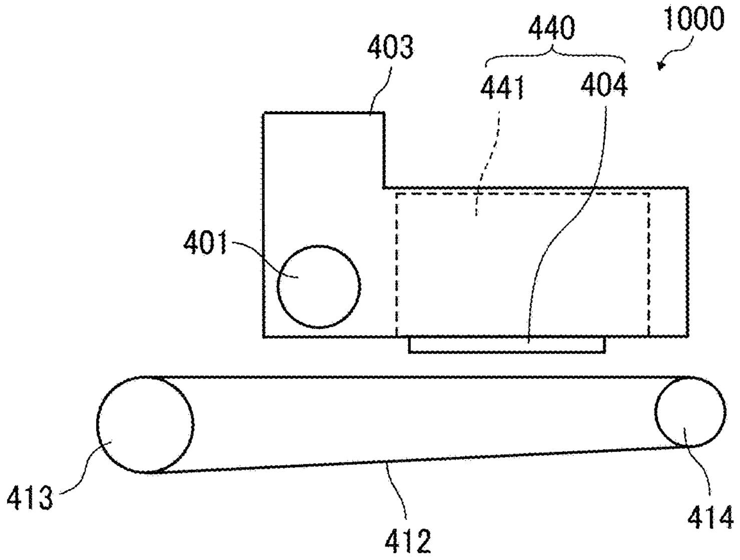
FIG. 15 is a schematic side view of a main portion of the liquid discharge apparatus.

FIG. 15 is a side view of a portion of the liquid discharge apparatus 1000 of FIG. 14.

The liquid discharge apparatus 1000 is a serial-type apparatus, and the carriage 403 reciprocally moves in the main scanning direction MSD by the main scan moving unit 493. The main scan moving unit 493 includes a guide 401, a main scan motor 405, a timing belt 408, and the like. The guide 401 is bridged between a left-side plate 491A and a right-side plate 491B to moveably hold the carriage 403. The main scan motor 405 reciprocally moves the carriage 403 in the main scanning direction MSD via the timing belt 408 bridged between a drive pulley 406 and a driven pulley 407.

The carriage 403 mounts the liquid discharge device 440. The head 404 (liquid discharge head) according to the above-described embodiments of the present disclosure and the head tank 441 form the liquid discharge device 440 as a single unit.

The head 404 of the liquid discharge device 440 discharges liquid of each color, for example, yellow (Y), cyan (C), magenta (M), and black (K). The head 404 includes a nozzle array including the multiple nozzles 4 (see FIG. 2) arrayed in row in a sub-scanning direction perpendicular to the main-scanning direction MSD. The head 404 is mounted to the carriage 403 so that ink droplets are discharged downward. The sub-scanning direction is indicated by arrow SSD in FIG. 14.

The liquid stored in liquid cartridges 450 are supplied to the head tank 441 by a supply unit 494 to supply the liquid stored outside the head 404 to the head 404.

The supply unit 494 includes a cartridge holder 451 serving as a filling part to mount the liquid cartridges 450, a tube 456, a liquid feeder 452 including a liquid feed pump, and the like. The liquid cartridge 450 is detachably attached to the cartridge holder 451. The liquid is fed from the liquid cartridge 450 to the head tank 441 by the liquid feeder 452 via the tube 456.

The liquid discharge apparatus 1000 includes a conveyor 495 to convey a sheet 410. The conveyor 495 includes a conveyance belt 412 as a conveyor and a sub scan motor 416 to drive the conveyance belt 412.

The conveyance belt 412 attracts the sheet 410 and conveys the sheet 410 at a position facing the head 404. The conveyance belt 412 is an endless belt stretched between a conveyance roller 413 and a tension roller 414. Attraction of the sheet 410 to the conveyance belt 412 may be applied by electrostatic adsorption, air suction, or the like.

The conveyance belt 412 rotates in the sub scanning direction SSD as the conveyance roller 413 is rotationally driven by the sub scan motor 416 via the timing belt 417 and the timing pulley 418.

At one side in the main scanning direction MSD of the carriage 403, a maintenance unit 420 to maintain the head 404 in good condition is disposed on a lateral side of the conveyance belt 412.

The maintenance unit 420 includes, for example, a cap 421 to cap a nozzle face of the head 404 and a wiper 422 to wipe the nozzle face. The nozzle face is a surface of the head 404 on which the multiple nozzles 4 are formed.

The main scan moving unit 493, the supply unit 494, the maintenance unit 420, and the conveyor 495 are mounted to a housing that includes the left-side plate 491A, the right-side plate 491B, and the rear-side plate 491C.

In the liquid discharge apparatus 1000 thus configured, the sheet 410 is conveyed on and attracted to the conveyance belt 412 and is conveyed in the sub-scanning direction SSD by the cyclic rotation of the conveyance belt 412.

The head 404 is driven in response to image signals while the carriage 403 moves in the main scanning direction MSD, to discharge a liquid to the sheet 410 stopped, thus forming an image on the sheet 410.

As described above, the liquid discharge apparatus 1000 includes the head 404 according to the present disclosure, thus allowing stable formation of high-quality images.

Next, the liquid discharge device 440 according to a fifth embodiment of the present disclosure is described with reference to FIG. 16.

Figure 16:
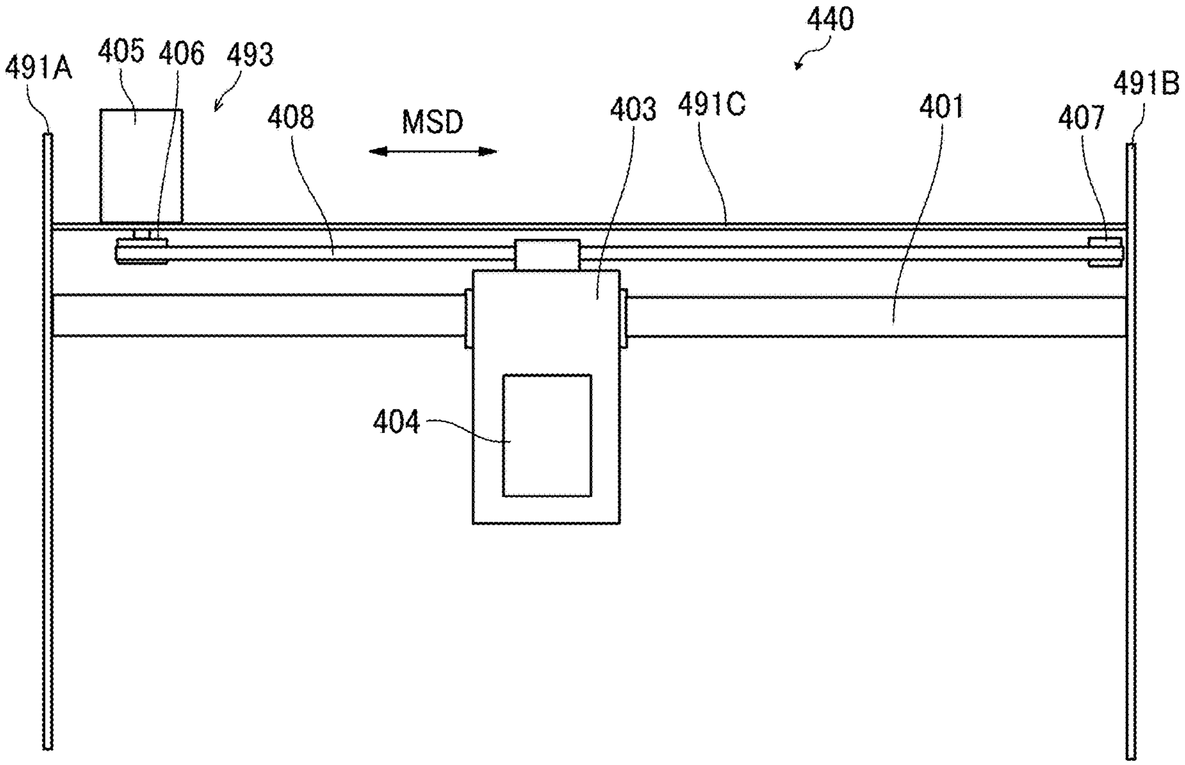
FIG. 16 is a plan view of a main part of an example of a liquid discharge device according to a fifth embodiment of the present disclosure.

FIG. 16 is a plan view of a part of the liquid discharge device 440 according to the fifth embodiment.

The liquid discharge device 440 includes a housing, the main scan moving unit 493, the carriage 403, and the head 404 among components of the liquid discharge apparatus 1000. The left-side plate 491A, the right-side plate 491B, and the rear-side plate 491C configure the housing.

The liquid discharge device 440 may be configured to further attach at least one of the above-described maintenance unit 420 and the supply unit 494 to, for example, the right-side plate 491B of the liquid discharge device 440.

Next, still another example of the liquid discharge device 440 according to a sixth embodiment of the present disclosure is described with reference to FIG. 17.

Figure 17:
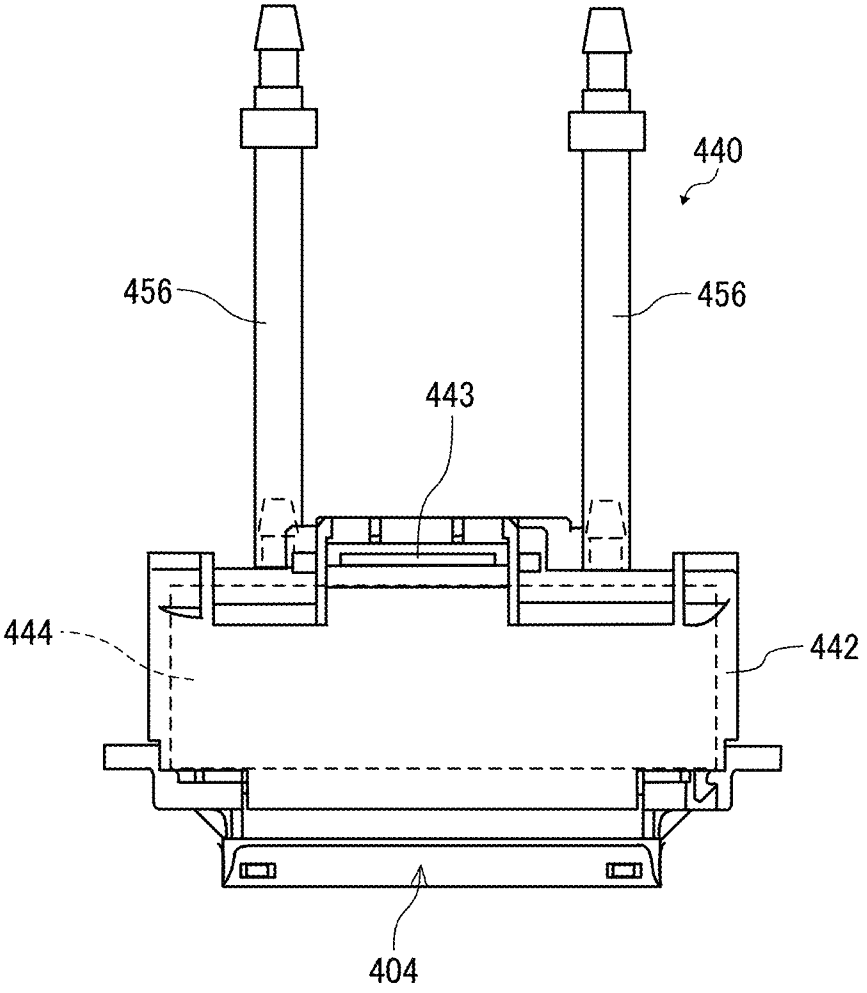
FIG. 17 is a schematic front view of still another example of the liquid discharge device according to a sixth embodiment of the present disclosure.

FIG. 17 is a front view of the liquid discharge device 440 according to the sixth embodiment.

The liquid discharge device 440 includes the head 404 to which a channel part 444 is mounted and a tube 456 connected to the channel part 444.

Further, the channel part 444 is disposed inside a cover 442. Instead of the channel part 444, the liquid discharge device 440 may include the head tank 441. A connector 443 electrically connected with the head 404 is provided on an upper part of the channel part 444.

In the above-described embodiments, the "liquid discharge apparatus" includes the head or the liquid discharge device and drives the head to discharge a liquid. The liquid discharge apparatus may be, for example, an apparatus capable of discharging liquid to a material onto which liquid can adhere and an apparatus to discharge liquid toward gas or into liquid.

The "liquid discharge apparatus" may include units to feed, convey, and eject the material on which liquid can adhere. The liquid discharge apparatus may further include a pretreatment apparatus to coat a treatment liquid onto the material, and a post-treatment apparatus to coat a treatment liquid onto the material, onto which the liquid has been discharged.

The "liquid discharge apparatus" may be, for example, an image forming apparatus to form an image on a sheet by discharging ink, or a three-dimensional fabrication apparatus to discharge a fabrication liquid to a powder layer in which powder material is formed in layers to form a three-dimensional fabrication object.

The "liquid discharge apparatus" is not limited to an apparatus to discharge liquid to visualize meaningful images, such as letters or figures. For example, the liquid discharge apparatus may be an apparatus to form arbitrary images, such as arbitrary patterns, or fabricate three-dimensional images.

The above-described term "material on which liquid can adhere" represents a material on which liquid is at least temporarily adhered, a material on which liquid is adhered and fixed, or a material into which liquid is adhered to permeate. Examples of the "material on which liquid can adhere" include recording media, such as paper sheet, recording paper, recording sheet of paper, film, and cloth, electronic component, such as electronic substrate and piezoelectric element, and media, such as powder layer, organ model, and testing cell. The "material on which liquid can adhere" includes any material on which liquid can adhere, unless particularly limited.

Examples of the "material on which liquid can adhere" include any materials on which liquid can adhere even temporarily, such as paper, thread, fiber, fabric, leather, metal, plastic, glass, wood, ceramic, construction materials (e.g., wallpaper or floor material), and cloth textile.

Examples of the "liquid" are, e.g., ink, treatment liquid, DNA sample, resist, pattern material, binder, fabrication liquid, or solution and dispersion liquid including amino acid, protein, or calcium.

The "liquid discharge apparatus" may be an apparatus to relatively move the head and a material on which liquid can adhere. However, the liquid discharge apparatus is not limited to such an apparatus. For example, the liquid discharge apparatus may be a serial head apparatus that moves the head or a line head apparatus that does not move the head.

Examples of the "liquid discharge apparatus" further include a treatment liquid coating apparatus to discharge a treatment liquid to a sheet surface to coat the sheet with the treatment liquid to reform the sheet surface and an injection granulation apparatus to discharge a composition liquid including a raw material dispersed in a solution from a nozzle to mold particles of the raw material.

The "liquid discharge device" is an assembly of parts relating to liquid discharge. The term "liquid discharge device" represents a structure including the head and a functional part(s) or mechanism combined to the head to form a single unit. For example, the "liquid discharge device" includes a combination of the head with at least one of a head tank, a carriage, a supply unit, a maintenance unit, and a main scan moving unit to form a single unit.

Here, examples of the "single unit" include a combination in which the head and a functional part(s) or unit(s) are secured to each other through, e.g., fastening, bonding, or engaging, and a combination in which one of the head and a functional part(s) or unit(s) is movably held by another. The head may be detachably attached to the functional part(s) or unit(s) s each other.

For example, as a liquid discharge device, there is a liquid discharge device in which the head 404 and the head tank 441 form a single unit, as in the liquid discharge device 440 illustrated in FIG. 15. The head and the head tank may be connected with each other via, e.g., a tube to integrally form the liquid discharge device. A unit including a filter may be added at a position between the head tank and the head of the liquid discharge device.

In another example, the head and the carriage may form the liquid discharge device as a single unit.

In still another example, the liquid discharge device includes the head movably held by a guide that forms part of a main scan moving unit, so that the head and the main scan moving unit form a single unit. Like the liquid discharge device 440 illustrated in FIG. 16, the head, the carriage, and the main scan moving unit may form the liquid discharge device as a single unit.

In still another example, a cap that forms a part of the maintenance unit may be secured to the carriage mounting the head so that the head, the carriage, and the maintenance unit form a single unit to form the liquid discharge device.

Like the liquid discharge device 440 illustrated in FIG. 17, the tube 456 is connected to the head 404 mounting the head tank 441 or the channel part 444 so that the head 404 and the supply unit 494 form a single unit as the liquid discharge device 440.

The main scan moving unit may be a guide only. The supply unit may be a tube(s) only or a loading unit only.

The pressure generator used in the "liquid discharge head" is not limited to a particular-type of pressure generator. The pressure generator is not limited to the piezoelectric actuator (or a laminated-type piezoelectric element) described in the above-described embodiments, and may be, for example, a thermal actuator that employs a thermoelectric transducer element, such as a thermal resistor or an electrostatic actuator including a diaphragm and opposed electrodes.

The terms "image formation", "recording", "printing", "image printing", and "fabricating" used herein may be used synonymously with each other.

Although the preferred embodiments of the present disclosure have been described above, the present disclosure is not limited to the embodiments described above, and a variety of modifications can naturally be made within the scope of the present disclosure. Further, two or more of the above embodiments can be combined with each other to configure the piezoelectric actuator.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A piezoelectric actuator comprising:
a piezoelectric element substrate comprising:
a diaphragm;
multiple piezoelectric elements each comprising:
a first electrode on the diaphragm;
a piezoelectric layer on the first electrode; and
a second electrode on the piezoelectric layer;
a metal wiring layer on the second electrode, the metal wiring layer including wiring patterns coupled to the multiple piezoelectric elements; and
a subframe bonded to a bonding region of the piezoelectric element substrate around a periphery of a first wiring region where the multiple piezoelectric elements are disposed via adhesive,
wherein the subframe has housing recesses respectively housing the multiple piezoelectric elements and a wiring recess different from the housing recesses, the wiring recess facing the wiring patterns in the bonding region around the periphery of the first wiring region where the multiple piezoelectric elements are disposed and not housing any of the multiple piezoelectric elements.

2. The piezoelectric actuator according to claim 1,
wherein the wiring patterns includes multiple wiring patterns corresponding to the multiple piezoelectric elements,
the recess includes multiple recesses corresponding to the multiple wiring patterns, and
the multiple recesses are respectively facing the multiple wiring patterns in the bonding region.

3. The piezoelectric actuator according to claim 2,
wherein the multiple recesses respectively have shapes matched with shapes of the wiring patterns.

4. The piezoelectric actuator according to claim 1,
wherein the metal wiring layer includes:
a wiring pattern region including the wiring patterns; and
the bonding region around a periphery of the wiring pattern region, the bonding region including a specific region including a part of the wiring patterns; and
the recess faces the specific region.

5. The piezoelectric actuator according to claim 4,
wherein the recess has one rectangle area that covers the wiring patterns in the specific region.

6. The piezoelectric actuator according to claim 1,
wherein the multiple piezoelectric elements are configured deform the diaphragm.

7. The piezoelectric actuator according to claim 1,
wherein the subframe has housing recesses respectively housing the multiple piezoelectric elements.

8. A liquid discharge head comprising:
the piezoelectric actuator according to claim 1,
a nozzle plate having multiple nozzles to discharge a liquid from the multiple nozzles.

9. A liquid discharge device comprising:
the liquid discharge head according to claim 8.

10. A liquid discharge apparatus comprising:
the liquid discharge device according to claim 9; and
a conveyor configured to convey a sheet to a position facing the liquid discharge device.

11. The piezoelectric actuator according to claim 1, wherein, in a plan view, the recess does not overlap the multiple piezoelectric elements.

* * * * *